United States Patent Office 3,054,801
Patented Sept. 18, 1962

---

3,054,801
QUATERNARY AMMONIUM COMPOUNDS AND THE PREPARATION THEREOF
Frederick Charles Copp, London, England, assignor to Burroughs Wellcome & Co. (U.S.A.) Inc., Tuckahoe, N.Y., a corporation of New York
No Drawing. Filed Dec. 11, 1958, Ser. No. 779,523
Claims priority, application Great Britain Dec. 18, 1957
6 Claims. (Cl. 260—332.3)

The present invention relates to quaternary ammonium compounds and the preparation thereof.

It has been found that quaternary ammonium compounds of the general Formula I are active against parasitic nematodes closely associated with the mucosa of the stomach and intestine. For example, the compounds have been shown by screening tests carried out against *Nippostrongylus miris* in rats, *Nematospiroides dubius* in mice and *Ancylostoma caninum* in dogs and cats to effectively decrease the worm infestations in the mammals.

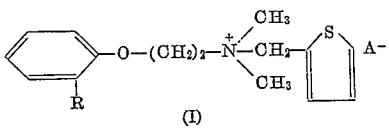

In this and succeeding formulae:
R is a hydrogen or halogen atom or a methyl or nitro group; and
A⁻ is an equivalent of an anion of an acid, for example chloride, bromide, iodide, methylsulphate, sulphate and p-toluenesulphonate.

According to the present invention in one aspect, therefore, there are provided quaternary ammonium compounds of the general Formula I.

The preferred compounds of the present invention are the salts of the N:N-dimethyl-N-2-phenoxyethyl-N-2'-thenylammonium and N-2-o-methylphenoxyethyl-N:N-dimethyl-N-2'-thenylammonium cations. The nature of the anion, A⁻, in the compounds of the present invention, is of minor importance, the anthelmintic properties being an intrinsic characteristic of the cation.

The compounds of the present invention may be prepared by the usual and well known process for the preparation of quaternary ammonium compounds, which may be defined as the reaction of a tertiary amine containing three of the four groups desired in the quaternary ammonium product with a suitable reactive derivative of the fourth group it is desired to introduce. The word "known" is to be understood as designating any such process which is in actual use or described in the literature on the subject.

For example, the compounds of the present invention may be prepared by the quaternisation of a tertiary amine of the general Formula II with a molecular proportion of a suitable methylating

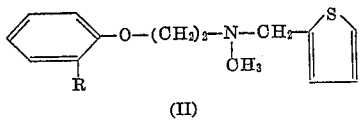

agent, for example methyl iodide, dimethyl sulphate or methyl p-toluenesulphonate. They may also be prepared by the reaction of a secondary amine of the general Formula III with two molecular proportions of a suitable methylating

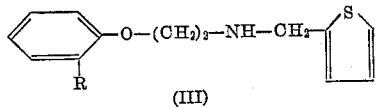

agent in the presence of an acid binding agent, such as sodium carbonate. It will be understood that the latter reaction proceeds with the intermediate formation of the tertiary amine (II) and therefore amounts to the simultaneous formation of this amine and its quaternisation. Both these reactions may be effected in any suitable solvent, for example acetone or methanol. In practice, it is generally preferable to use rather more than the theoretically required amount of the methylating agent to obtain a good yield of the desired product in either of the reactions.

Further examples of the process of preparation of the compounds of the present invention are indicated by the following reactions:

(i) 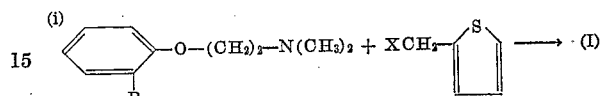

(ii) 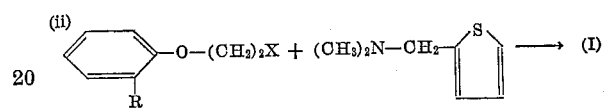

In these formulae, X is a suitable reactive group, for example, chlorine, bromide, iodine or sulphonyloxy group, such as p-toluenesulphonyloxy.

Reaction (i) may be assisted by the presence of potassium iodide, when the desired quaternary ammonium compound is usually isolated as the iodide. Both reactions (i) and (ii) may be conveniently effected in any suitable solvent, for example isopropanol or acetone. Reaction (i) proceeds readily. The reaction mixture of Reaction (ii), however, requires heating for a prolonged period; in fact, the reaction may be effected by heating the reactants together without the presence of a solvent.

The present invention in another aspect, therefore, comprises the above described process of preparation of the compounds of the general Formula I.

If desired the salt produced by any such process of preparation may be converted by methods known per se into the salt of another acid. In certain cases, it may be convenient to use salts which are sparingly soluble in water, for example, salts whose solubility in water is less than 1.0% w./v. at 20° C. For example, one cation of the cationic structure defined in Formula I may be combined with one monovalent anion of p-chlorobenzenesulphonic acid, or two cations of the cationic structure defined in Formula I may be combined with one divalent anion of embonic acid, namely 2:2'-dihydroxy-1:1-dinaphthylmethane-3:3'-dicarboxylic acid (see Barber and Gaimster, Journal of Applied Chemistry, 1952, vol. 2, page 565), to produce respectively the p-chlorobenzenesulphonate and the embonate, which are sparingly soluble in water.

The compounds of the present invention may be presented in any suitable pharmaceutical preparation, for example, as tablets, suppositories, capsules, or, if the compound is sparingly soluble in water, as an aqueous suspension containing if desired one or more suitable suspending agents. The pharmaceutical preparation may conveniently be presented in unit dosage form. It may be prepared by any of the methods well known to the art of pharmacy, for example, by admixture with a suitable carrier therefor.

The invention will now be described by reference to the following examples, in which all temperatures are given in degrees centigrade.

*Example 1*

A mixture of 1-bromo-2-phenoxyethane (20 g.) and 2-thenylamine (24 g.) in benzene (25 ml.) was heated on a steam bath for 30 minutes. After cooling, the precipitated 2-thenylamine:hydrobromide was filtered off and washed with fresh benzene. The combined filtrate and washings were shaken with aqueous 4 N-sodium hydroxide, then with water and then evaporated to give an oily residue to which excess concentrated hydrochloric acid was added. The resulting semi-solid mass was filtered and the residue recrystallised from ethanol to give 1-phenoxy-2:2'-thenylaminoethane hydrochloride, melting point 164–165°.

This hydrochloride (6 g.) was decomposed with aqueous 4 N-ammonia and the precipitated base was extracted with ether. The ethereal solution was dried and evaporated. The residue was dissolved in methanol (30 ml.); methyl iodide (10 ml.) and powdered sodium carbonate were added and the resulting mixture was heated to reflux after 20 minutes. After cooling, the solid was filtered off and ether added to the residual filtrate. A gum was precipitated and rapidly crystallised. Recrystallisation from ethanol gave pure N:N-dimethyl-N-2-phenoxyethyl-N-2'-thenylammonium iodide, melting point 121–122°.

*Example 2*

By processes similar to those described in Example 1, 1-bromo-2-o-chlorophenoxyethane and 2-thenylamine were reacted together to yield 1-o-chlorophenoxy-2:2'-thenylaminoethane which was isolated as its hydrochloride, melting point 142°. The corresponding free base was then treated with excess methyl iodide in methanol in presence of anhydrous sodium carbonate to yield N-2-o-chlorophenoxyethyl-N:N - dimethyl - N-2' - thenylammonium iodide, melting point 100°.

*Example 3*

By processes similar to those described in Example 1, 1-bromo-2-o-methylphenoxyethane was reacted with 2-thenylamine to give 1-o-methylphenoxy-2:2'-thenylaminoethane which was isolated as its hydrochloride, melting point 168–169°. The corresponding free base was then reacted with excess methyl iodide in methanol in presence of anhydrous sodium carbonate to yield N-2-o-methylphenoxyethyl - N:N-dimethyl - N-2'-thenylammonium iodide, melting point 111–112°.

*Example 4*

2-thenyl chloride (2-chloromethylthiophen) (6.6 g.) was added to a solution of 1-dimethylamino-2-phenoxyethane (8.2 g.) in acetone (45 ml.). On standing for 30 minutes an oil separated. The resulting suspension was heated to reflux for a further 30 minutes and cooled. On standing, the separated oil partially crystallised. The supernatant liquors were decanted and the residue was recrystallised by dissolution in warm isopropanol and careful precipitation with ethyl acetate or ether to give colourless needles of N:N-dimethyl - N - 2 - phenoxyethyl-N-2'-thenylammonium chloride monohydrate, melting point 85–86°. This chloride was dissolved in water (15 ml.) and a solution of potassium iodide (3.8 g.) in water (15 ml.) was added to give a gum which subsequently crystallised. The resulting N:N-dimethyl-N-2-phenoxyethyl-N-2'-thenylammonium iodide was recrystallised from ethanol to give colourless needles, melting point 121–122°. This salt was identical with the salt described in Example 1.

*Example 5*

By processes analogous to those described in Example 4, 1-dimethylamino - 2 - o - methylphenoxyethane and 2-thenyl chloride were reacted together to give N:N-di-methyl - N-2-o - methylphenoxyethyl - N-2'-thenylammonium chloride, a colourless deliquescent solid, melting point 129–130°. When dissolved in water and reacted with a small excess of potassium iodide, it gave N:N-dimethyl-N-2-o-methylphenoxyethyl - N-2'-thenylammonium iodide, identical with the product described in Example 3.

*Example 6*

1-bromo-2-o-chlorophenoxyethane (100 g.) was slowly added to a stirred solution of dimethylamine (33% w./w.; 300 g.) in ethanol. The temperature of the mixture rose from 20° to 47° in the course of an hour. After standing overnight at room temperature, the mixture was reheated to 50° for 2 hours and then evaporated on a steam-bath. Excess concentrated ammonia was added to the residue and the precipitated oil extracted with ether. The aqueous layer was separated and re-extracted with ether. The combined ethereal extracts were exhaustively extracted with 2 N-hydrochloric acid and these combined extracts were cooled in ice and basified with excess 10 N-sodium hydroxide. The precipitated oil was re-extracted with ether. The ethereal extract was dried over potassium carbonate, filtered, evaporated and the residue distilled in vacuo. 1-o-chlorophenoxy-2-dimethylaminoethane was obtained as a colourless liquid, boiling point 134–138°/16 mm.

By processes analogous to those described in Example 4, the base was reacted with 2-thenyl chloride to give N-2-o-chlorophenoxy - ethyl-N:N - dimethyl-N-2'-thenylammonium chloride dihydrate, melting point 168–169°.

*Example 7*

A solution of 1-bromo-2-phenoxyethane (12 g.) and N-methyl-N-2-thenylamine (15.8 g.) in benzene (45 ml.) was heated on a steambath for 3 hours. After cooling, the precipitated N-methyl-N-2-thenylamine hydrobromide was filtered off and washed with fresh benzene. The combined filtrate and washings were exhaustively extracted with 2 N-hydrochloric acid and the combined extracts were basified with concentrated ammonia. The precipitated oil was taken up into ether, the ethereal solution was washed with water, dried over anhydrous potassium carbonate, filtered and evaporated. The residue was distilled in vacuo to give N-methyl-N-2-phenoxyethyl-N-2'-thenylamine, boiling point 198–200°/18 mm.

A solution of this base (2.5 g.) and methyl p-toluenesulphonate (1.9 g.) were reacted together in boiling acetone (5 ml.). After 30 minutes the solution was cooled and ethyl acetate added to precipitate a colourless solid, N:N-dimethyl-N-2-phenoxyethyl-N-2' - thenylammonium p-toluenesulphonate, which crystallised in colourless plates from a mixture of acetone and ethyl acetate, melting point 113–114°.

*Example 8*

Dimethyl sulphate (1.4 g.) was added to a solution of the above base (2.5 g.) in acetone (4 ml.). There was a vigorous spontaneous reaction; when this had subsided the mixture was heated to reflux for 15 minutes. After cooling, the product, N:N-dimethyl-N-2-phenoxyethyl-N-2'-thenylammonium methylsulphate, was precipitated by the addition of ether but it was an uncrystallisable gum. Its identity was confirmed by dissolving in water (10 ml.) and extracting the solution with ether. Solid potassium iodide (3 g.) was then added to give a gum which subsequently crystallised. The resulting N:N-dimethyl-N-2-phenoxyethyl-N-2'-thenylammonium iodide was recrystallised from ethanol and ethyl acetate and was then identical with the product described in Example 1.

*Example 9*

Methyl iodide (500 mg.) was added to a solution of N-methyl-N-2-phenoxyethyl-N-2'-thenylamine in acetone (2 ml.). There was a vigorous reaction. Finally the mixture was refluxed for 5 minutes. The addition of ethyl acetate (3 ml.) gave a crystalline precipitate of N:N - dimethyl-N-2-phenoxyethyl-N-2'-thenylammonium iodide, identical with the produce described in Example 1.

*Example 10*

A solution of 1-bromo-2-phenoxyethane (2 g.) and N:N-dimethyl-N-2-thenylamine (1.4 g.) in isopropanol (2 ml.) was heated on a steambath for 4 hours. Ether (10 ml.) was added to the cooled solution to precipitate N:N - dimethyl-N-2-phenoxyethyl-N-2'-thenylammonium bromide as a gum which could not be crystallised. It was dissolved in water and solid potassium iodide (3 g.) was added to precipitate N:N-dimethyl-N-2-phenoxyethyl-N-2'-thenylammonium iodide. This was recrystallized from methanol and ethyl acetate to give a product identical with that described in Example 1.

*Example 11*

1-bromo-2-phenoxyethane (2.0 g.) and N:N-dimethyl-N-2'-thenylamine (1.4 g) were mixed together without a solvent and heated on a steam-bath for 2 hours. During this time two layers were formed. The resulting mixture was cooled and stirred with ether (20 ml). The ethereal layer was decanted off and the residue was shaken with water. Some insoluble oil was extracted from the resulting solution with ether. Potassium iodide (3 g.) was added to the aqueous residue to precipitate a gum. This was allowed to settle and the aqueous layer was decanted. The residue slowly solidified on stirring with ether. It was then collected, washed with fresh ether and recrystallised from a mixture of isopropanol and ether to give N:N-dimethyl-N-2-phenoxyethyl-N-2'-thenylammonium iodide identical with the product described in Example 1.

*Example 12*

A solution of 1-phenoxy-2-p-toluenesulphonoxyethane (2.9 g.) and N:N-dimethyl-N-2-thenylamine (1.4 g.) in isopropanol (2 ml.) was heated on a steam-bath for 4 hours. The resulting solution was dropped into ether (20 ml.) to precipitate N:N-dimethyl-2-phenoxyethyl-N-2'-thenylammonium p-toluenesulphonate, which slowly solidified. It was recrystallized from a very little acetone and ethyl acetate to give a product identical with that described in Example 7.

*Example 13*

A solution of N:N-dimethyl-N-2-phenoxyethyl-N-2'-thenylammonium chloride monohydrate (3.15 g.) in water (5 ml.) was added slowly to a stirred solution of disodium embonate (2.2 g.) in water (20 ml.). A mass of fine needles separated as the addition proceeded. The final mixture was kept for 24 hours and then filtered. The residual di-(N:N-dimethyl-N-2-phenoxyethyl-N-2'-thenylammonium) embonate tetrahydrate was washed with water and dried in vacuo, melting point 38–40°. The solubility of this salt in water was approximately 0.1% w./v. at 20°.

*Example 14*

By processes analogous to those described in Example 6, 1-bromo-2-o-bromophenoxyethane was reacted with dimethylamine in ethanol solution to yield 1-o-bromophenoxy-2-dimethylaminoethane, boiling point 84–86°/0.15 mm. This base was then reacted with 2-thenyl chloride by processes analogous to those described in Example 4 to yield N-2-o-bromophenoxyethyl-N:N-dimethyl-N-2'-thenylammonium chloride. This was a colourless solid which crystallised from a mixture of isopropanol and ether, melting point 170–171°.

*Example 15*

A mixture of ethylene dibromide (66.5 g.), o-fluorophenol (31 g.) and water (250 ml.) was heated to reflux with stirring. A solution of sodium hydroxide (10.7 g.) in water (50 ml.) was then dropped in over a period of 50 minutes. After this addition was completed, the mixture was stirred at reflux for a further 6 hours. After cooling, the mixture was extracted with ether. The ethereal extract was washed twice with 2 N-sodium hydroxide to remove unchanged starting material and once with water, dried over calcium chloride, filtered and evaporated. The residue was distilled in vacuo when 1-bromo-2-o-fluorophenoxyethane was obtained as a colourless liquid, boiling point 118–121°/15 mm.

This was reacted with dimehylamine in ethanolic solution by processes analogous to those described in Example 6 to give 1-dimethylamino-2-o-fluorophenoxyethane, boiling point 102–106°/16 mm. This base was then reacted with 2-thenyl chloride by processes analogous to those described in Example 4 to yield N-2-o-fluorophenoxyethyl-N:N-dimethyl-N-2'-thenylammonium chloride, a rather deliquescent solid, melting point 108–109°. It was dissolved in water and excess potassium iodide added to give a gum which subsequently solidified, melting point 53–55°. This product, N-2-o-fluorophenoxyethyl-N:N-dimethyl-N-2'-thenylammonium iodide, could not be recrystallised.

*Example 16*

1-bromo-2-o-nitrophenoxyethane (40 g.) was added gradually to warm ethanolic dimethylamine (33% w./w.; 108 g.) at such a rate as to maintain the temperature of the mixture at 36–40°. The mixture was kept overnight at room temperature and then heated to ca. 60° for 1 hour. The resulting mixture was evaporated on a steam-bath. The residue was treated with excess concentrated ammonia and the precipitated oil was extracted with ether. This ethereal extract was washed once with water and then exhaustively extracted with 6 N-hydrochloric acid. The combined extracts were evaporated in vacuo and the residual 1-dimethylamino-2-o-nitrophenoxyethane hydrochloride was recrystallized from methanol, melting point 170–172°.

The pure parent base was regenerated by shaking this salt with excess concentrated ammonia and collecting the precipitated oil in ether. Evaporation of the ethereal solution gave pure 1-dimethylamino-2-o-nitrophenoxyethane.

2-thenyl chloride (5.5 g.) was added to a solution of this base (7 g.) in acetone (5 ml.). A vigorous reaction took place with the formation of a semi-solid mass of crystals. More acetone (5 ml.) was added. The mixture was kept for 30 minutes and then heated to reflux for a further 5 minutes. After cooling, the resulting N:N-dimethyl-N-2-o-nitrophenoxy-N-2'-thenylammonium chloride was obtained as a deliquescent solid, melting point 152–153.5°. It was recrystallised from ethanol as a monohydrate, melting point 91–92°.

*Example 17*

A solution of N:N-dimethyl-N-2-phenoxyethyl-N-2'-thenylammonium chloride monohydrate (3.15 g.) in water (30 ml.) was added to a solution of sodium p-chlorobenzenesulphonate (2.6 g.) in warm water (30 ml.). A crystalline solid was precipitated from the mixture. This was collected, washed and dried in vacuo. It was recrystallised by precipitation from isopropanol with ether, melting point 159–160°. The solubility of this salt in water was approximately 0.6% w./v. at 20°.

I claim:

1. A quaternary ammonium compound of the formula:

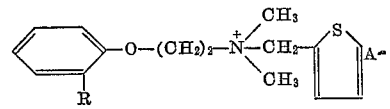

wherein R is selected from the class consisting of hydrogen and halogen atoms and methyl and nitro groups, and A⁻ is an anion equivalent of a physiologically acceptable acid.

2. A quaternary ammonium compound of the formula defined in claim 1 wherein the anionic portion A⁻ is so chosen as to give a physiologically acceptable salt whose solubility in water is less than 1.0% w./v. at 20° C.

3. A quaternary ammonium compound as defined in claim 1 wherein said anionic portion A⁻ is the monovalent anion of p-chlorobenzenesulphonic acid.

4. A quaternary ammonium compound as defined in claim 1 wherein said anionic portion A⁻ is the equivalent of the divalent anion of embonic acid.

5. A physiologically acceptable salt of the N:N-dimethyl-N-2-phenoxyethyl-N-2′-thenylammonium cation.

6. A physiologically acceptable salt of the N-2-o-methylphenoxyethyl-N:N-dimethyl-N-2′-thenylammonium cation.

References Cited in the file of this patent

UNITED STATES PATENTS

| | | |
|---|---|---|
| 2,569,803 | de Benneville et al. | Oct. 2, 1951 |
| 2,579,500 | Kerwin et al. | Dec. 25, 1951 |
| 2,683,719 | Kerwin et al. | July 13, 1954 |
| 2,691,616 | Dickey et al. | Oct. 12, 1954 |
| 2,746,973 | Gregory et al. | May 22, 1956 |
| 2,852,562 | Surrey | Sept. 16, 1958 |
| 2,876,263 | Mark | Mar. 3, 1960 |
| 2,928,766 | Rosen | Mar. 15, 1960 |

FOREIGN PATENTS

| | | |
|---|---|---|
| 673,509 | Great Britain | June 4, 1952 |